(12) United States Patent
Takahashi et al.

(10) Patent No.: US 8,368,523 B2
(45) Date of Patent: Feb. 5, 2013

(54) COLLISION DETECTION SENSOR FOR VEHICLE

(75) Inventors: Hisashi Takahashi, Kariya (JP); Shuji Nakamura, Gifu (JP)

(73) Assignee: Denso Corporation, Kariya (JP)

( * ) Notice: Subject to any disclaimer, the term of this patent is extended or adjusted under 35 U.S.C. 154(b) by 478 days.

(21) Appl. No.: 12/218,072

(22) Filed: Jul. 10, 2008

(65) Prior Publication Data

US 2009/0015392 A1 Jan. 15, 2009

(30) Foreign Application Priority Data

Jul. 13, 2007 (JP) ................................. 2007-183851

(51) Int. Cl.
*B60Q 1/00* (2006.01)
(52) U.S. Cl. ...................... 340/436; 340/573.1; 340/901; 340/904; 293/132; 180/274
(58) Field of Classification Search .................... 340/436
See application file for complete search history.

(56) References Cited

U.S. PATENT DOCUMENTS

| | | | | | |
|---|---|---|---|---|---|
| 3,146,014 | A | * | 8/1964 | Kroell | 293/133 |
| 4,208,069 | A | * | 6/1980 | Huber et al. | 293/102 |
| 5,393,282 | A | * | 2/1995 | Maclean | 482/70 |
| 6,561,301 | B1 | * | 5/2003 | Hattori et al. | 180/274 |
| 2002/0043417 | A1 | * | 4/2002 | Ishizaki et al. | 180/274 |
| 2004/0041416 | A1 | * | 3/2004 | Harrison et al. | 293/117 |
| 2006/0028065 | A1 | * | 2/2006 | Thiede et al. | 303/193 |
| 2006/0043743 | A1 | * | 3/2006 | Shuler et al. | 293/120 |
| 2006/0087417 | A1 | * | 4/2006 | Kiribayashi | 340/435 |
| 2006/0185922 | A1 | * | 8/2006 | Tanabe | 180/274 |
| 2007/0181359 | A1 | | 8/2007 | Mader | |
| 2007/0222236 | A1 | | 9/2007 | Takahashi et al. | |
| 2009/0050395 | A1 | * | 2/2009 | Hosokawa et al. | 180/274 |

FOREIGN PATENT DOCUMENTS

| | | |
|---|---|---|
| JP | 2003-090776 | 3/2003 |
| JP | 2006-117157 | 5/2006 |
| JP | 2007-261307 | 10/2007 |
| JP | 2007-261309 | 10/2007 |
| WO | WO 2005/098384 | 10/2005 |

\* cited by examiner

*Primary Examiner* — Benjamin C Lee
*Assistant Examiner* — Curtis King
(74) *Attorney, Agent, or Firm* — Harness, Dickey & Pierce, PLC

(57) ABSTRACT

A collision detection sensor includes an absorber, a chamber member, a pressure sensor, and a collision detection circuit. The absorber is deformed with a collision to absorb collision impact force. The absorber is located in a vehicle bumper and located in front of a bumper reinforcement in a vehicle front-rear direction. The chamber member defines a chamber room therein. The chamber member is located in the bumper and located in front of the bumper reinforcement in the vehicle front-rear direction. The pressure sensor detects pressure in the chamber room. The collision detection circuit detects the collision based on the detected pressure. A front end of the absorber is located further away from the bumper reinforcement than a front end of the chamber member in the vehicle front-rear direction.

17 Claims, 6 Drawing Sheets

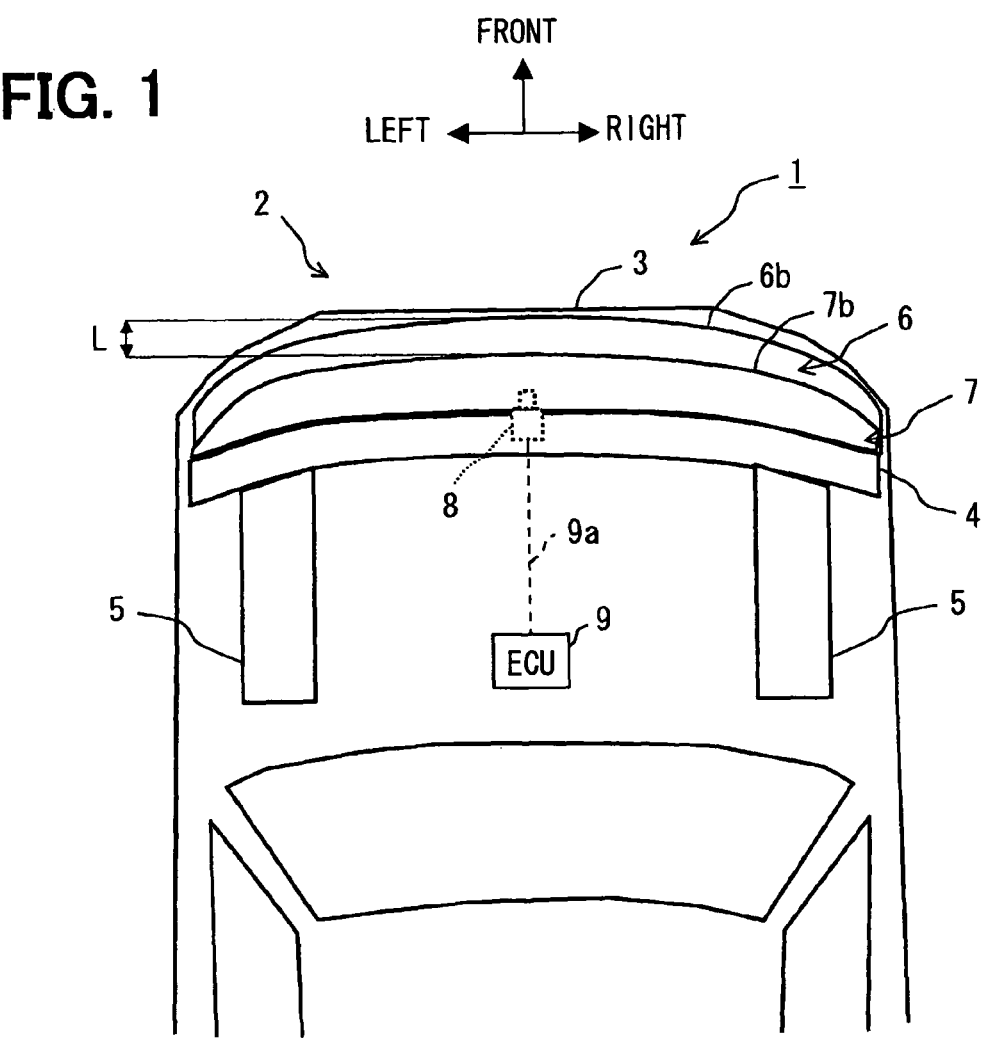
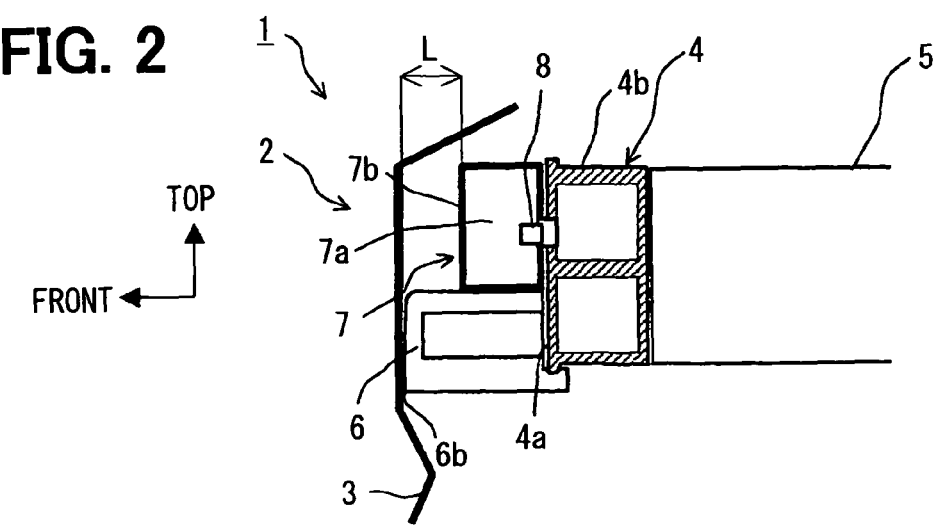

… … …

COLLISION DETECTION SENSOR FOR VEHICLE

CROSS REFERENCE TO RELATED APPLICATION

This application is based on and incorporates herein by reference Japanese Patent Applications No. 2007-183851 filed on Jul. 13, 2007.

FIELD OF THE INVENTION

The present invention relates to a collision detection sensor for detecting a collision of a vehicle bumper with an object, in particular, a pedestrian.

BACKGROUND OF THE INVENTION

Recently, there has been an increase in the number of vehicles equipped with a pedestrian protection device such as a deployable hood (i.e., pop up hood), a hood airbag, or the like. Such a pedestrian protection device is designed to be activated in a collision of a vehicle with a pedestrian. As disclosed in, for example, US 2007/0181359 corresponding to WO 2005/098384 or US 2006/0087417 corresponding to JP-A-2006-117157, a collision detection sensor has been proposed that detects a collision of a vehicle bumper with a pedestrian. The collision detection sensor includes a pressure sensor for detecting pressure in a chamber room. The chamber room is defined by a chamber member located between the bumper and a bumper reinforcement of a vehicle. When the bumper collides with the pedestrian, the chamber member is deformed so that the pressure in the chamber room can change. Based on the pressure change in the chamber room, the collision detection sensor determines whether the bumper collides with the pedestrian.

The pressure change may occur as a result of the deformation of the chamber member, even when the bumper collides with an object other than a pedestrian. For example, the chamber member may be deformed, when the bumper collides with a lightweight object such as a construction cone. However, there is no need to activate a pedestrian protection device in the event of such a light collision.

SUMMARY OF THE INVENTION

In view of the above-described problem, it is an object of the present invention to provide a collision detection sensor configured to prevent a pressure change in a chamber room from occurring in the event of a light collision.

A collision detection sensor for detecting a collision with a vehicle bumper includes an absorber, a chamber member, a pressure sensor, and a collision detection circuit. The absorber is located in the bumper and located in front of a bumper reinforcement in a vehicle front-rear direction. The absorber is deformed with the collision to absorb collision impact force. The chamber member is located in the bumper and located in front of the bumper reinforcement in the vehicle front-rear direction. The chamber member defines a chamber room therein. The pressure sensor detects pressure in the chamber room. The collision detection circuit detects the collision based on the detected pressure. A front end of the absorber is located further away from the bumper reinforcement than a front end of the chamber member in the vehicle front-rear direction.

BRIEF DESCRIPTION OF THE DRAWINGS

The above and other objectives, features and advantages of the present invention will become more apparent from the following detailed description made with check to the accompanying drawings. In the drawings:

FIG. 1 is a diagram illustrating a perspective top view of a vehicle bumper equipped with a collision detection sensor according to a first embodiment of the present invention;

FIG. 2 is a diagram illustrating a perspective side view of the collision detection sensor of FIG. 1;

DETAILED DESCRIPTION OF THE PREFERRED EMBODIMENTS

First Embodiment

Figure 3A:
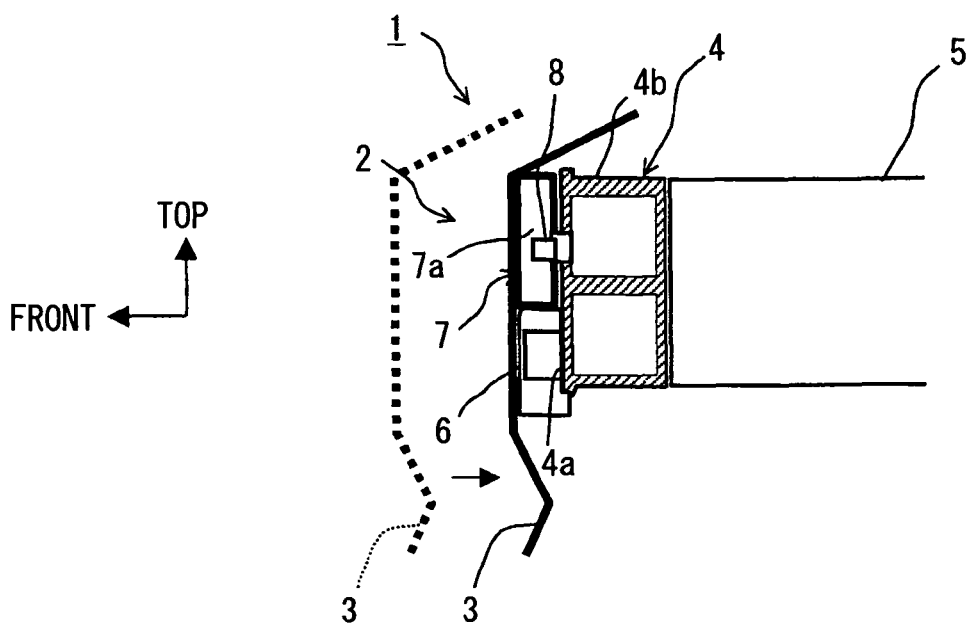
FIG. 3A is a diagram illustrating a perspective side view of the collision detection sensor of FIG. 1 in the event of a pedestrian collision.

Referring to FIGS. 1, 2, a collision detection sensor 1 according to a first embodiment of the present invention includes a chamber member 7, a pressure sensor 8, and an electronic control unit (ECU) 9 for controlling activation of a pedestrian protection apparatus (not shown). The chamber member 7 is installed in a bumper 2 of a vehicle.

As shown in FIGS. 1, 2, the bumper 2 includes a bumper cover 3, a bumper reinforcement 4, a side member 5, an absorber 6, and the chamber member 7.

The bumper cover 3 is located at a front end of the vehicle and extends in a vehicle left-right direction. The bumper cover 3 is fixed to a frame (i.e., body) of the vehicle and covers the bumper reinforcement 4, the absorber 6, and the chamber member 7. The bumper cover 3 is made of resin, for example, polypropylene.

As shown in FIG. 1, the bumper reinforcement 4 is installed in the bumper cover 3 and extends in the vehicle left-right direction. The bumper reinforcement 4 is made of metal.

As shown in FIG. 1, the side member 5 is a pair of metallic members. The side member 5 is located near each side of the vehicle in the vehicle left-right direction and extends in a vehicle front-rear direction. The bumper reinforcement 4 is fixed to a front end of the side member 5. Alternatively, a crash box can be interposed between the bumper reinforcement 4 and the side member 5.

As shown in FIG. 2, the absorber 6 is located in the bumper cover 3 and extends in the vehicle left-right direction. The absorber 6 is fixed to a lower side of a front surface 4a of the bumper reinforcement 4. The absorber 6 is shaped in the form of a hollow tube by bending a metal plate. Thus, the absorber 6 can absorb impact force exerted on the bumper 2. Alternatively, the absorber 6 can be made of resin foam. A width of the absorber 6 in the vehicle front-rear direction varies from one vehicle to another. For example, the width of the absorber 6 can vary in a range from about 40 millimeters to about 100 millimeters.

As shown in FIG. 2, the chamber member 7 is located in the bumper cover 3 and extends in the vehicle left-right direction. The chamber member 7 is fixed to an upper side of the front surface 4a of the bumper reinforcement 4. The chamber member 7 is made of synthetic resin and shaped in the form of a box. The chamber member 7 defines a substantially-sealed chamber room 7a therein. That is, the chamber room 7a is enclosed by walls of the chamber member 7. Each wall of the chamber member 7 has a thickness of about a few millimeters, for example. The chamber member 7 absorbs the impact force exerted on the bumper 2 and also transmits pressure to the pressure sensor 8.

A width of the chamber member 7 in the vehicle front-rear direction is set less than the width of the absorber 6 in the vehicle front-rear direction. A front end 7b of the chamber member 7 is located further (i.e., farther) away from the bumper cover 3 than a front end 6b of the absorber 6 in the vehicle front-rear direction. In other words, the front end 6b of the absorber 6 is located further away from the bumper reinforcement 4 than the front end 7b of the chamber member 7 in the vehicle front-rear direction.

Specifically, whereas the front end 6b of the absorber 6 is located in contact with or in close proximity to an inner surface of the bumper cover 3, the front end 7b of the chamber member 7 is spaced from the inner surface of the bumper cover 3 by a predetermined distance in the vehicle front-rear direction. Therefore, a separation distance L exists between the front end 6b of the absorber 6 and the front end 7b of the chamber member 7 in the vehicle front-rear direction. When the front end 6b of the absorber 6 is located in contact with the inner surface of the bumper cover 3, the front end 7b of the chamber member 7 is spaced from the inner surface of the bumper cover 3 by the separation distance L.

The separation distance L can vary according to stiffness of the entire bumper 2 including the absorber 6. For example, the separation distance L can vary in a range from about 5 millimeters to about 20 millimeters. When an energy absorption characteristic (force-stroke characteristic) of a combination of the bumper cover 3 and the absorber 6 is uniform over the bumper 2 in the vehicle left-right direction, the separation distance L can be set uniform over the bumper 2 in the vehicle left-right direction.

The pressure sensor 8 can detect gas pressure. The pressure sensor 8 is mounted to the chamber member 7 and detects pressure in the chamber room 7a. The pressure sensor 8 produces a pressure signal having an analog voltage proportional to the detected pressure and transmits the pressure signal to the ECU 9 via a signal line 9a.

The ECU 9 controls activation of the pedestrian protection apparatus. For example, the ECU 9 controls deployment of a pedestrian protection airbag. The ECU 9 receives the pressure signal from the pressure sensor 8 via the signal line 9a. The ECU 9 determines based on the pressure signal whether the bumper 2 collides with a pedestrian (i.e., human body). It is preferable that the ECU 9 should receive a vehicle speed signal from a vehicle speed sensor (not shown) and determine based on both the pressure signal and the speed signal whether the bumper 2 collides with the pedestrian.

Figure 3B:
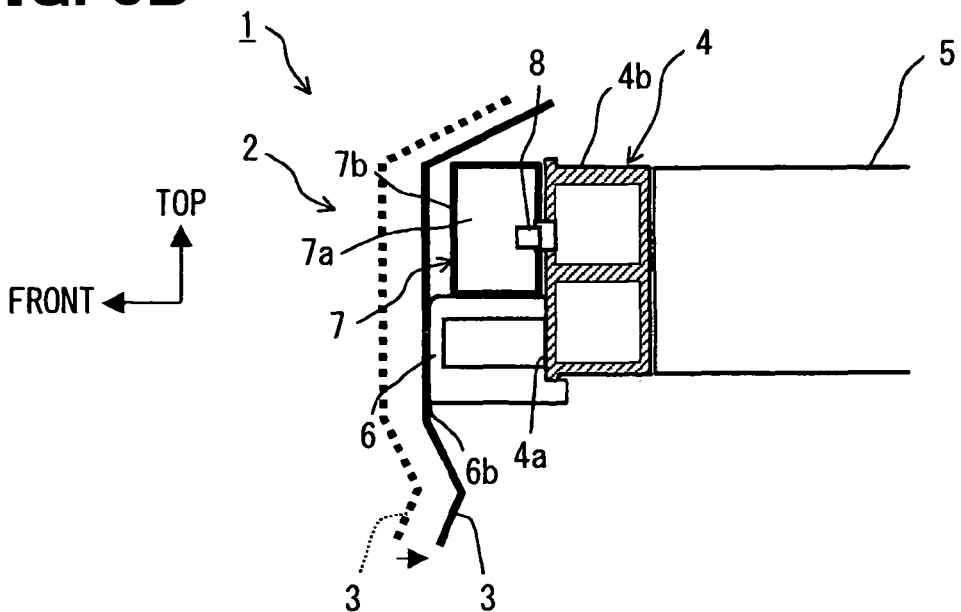
FIG. 3B is a diagram illustrating a perspective side view of the collision detection sensor of FIG. 1 in the event of a light collision.

The collision detection sensor 1 operates as follows. FIG. 2 illustrates the bumper 2 in a normal condition, where there is no collision. FIG. 3A illustrates the bumper 2 in the event of a pedestrian collision, where the bumper 2 collides with a pedestrian. FIG. 3B illustrates the bumper 2 in the event of a light collision. The light collision is defined as a collision having maximum collision energy less than minimum collision energy of the pedestrian collision.

As shown in FIG. 3A, when the pedestrian collision with the bumper 2 occurs, the bumper cover 3 is displaced relative to the bumper reinforcement 4 by a distance greater than the separation distance L. Consequently, the absorber 6 is pressed by the bumper cover 3 against the front surface 4a of the bumper reinforcement 4 and deformed. Like the absorber 6, the chamber member 7 is pressed by the bumper cover 3 against the front surface 4a of the bumper reinforcement 4 and deformed. As a result of the deformation of the chamber member 7, the pressure in the chamber room 7a changes.

The pressure sensor 8 mounted to the chamber member 7 detects the pressure change in the chamber room 7a and produces the pressure signal having the analog voltage proportional to the detected pressure. The pressure signal is transmitted via the signal line 9a to the ECU 9. The ECU 9 determines based on the pressure signal whether the bumper 2 collides with the pedestrian. If the ECU 9 determines that the pedestrian collision with the bumper 2 occurs, the ECU 9 activates the pedestrian protection apparatus.

In contrast, as shown in FIG. 3B, when the light collision with the bumper 2 occurs, the bumper cover 3 is displaced relative to the bumper reinforcement 4 by a distance less than the separation distance L. Consequently, the absorber 6 is pressed by the bumper cover 3 against the front surface 4a of the bumper reinforcement 4 and deformed. Unlike the absorber 6, the chamber member 7 is not pressed by the bumper cover 3, because the separation distance L exists between the front end 7b of the chamber member 7 and the front end 6b of the absorber 6. Therefore, in the event of the light collision, the chamber member 7 is not deformed, and the pressure in the chamber room 7a remains unchanged. As a result, the ECU 9 does not activate the pedestrian protection apparatus in the event of the light collision.

Figure 4:
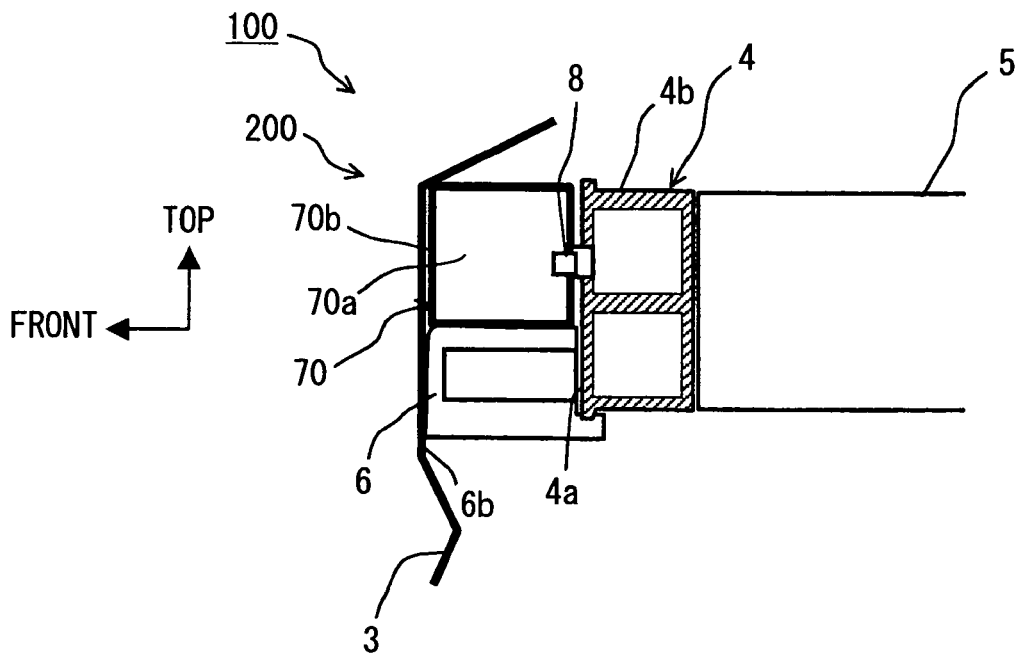
FIG. 4 is a diagram illustrating a perspective side view of a collision detection sensor according to a first comparison example.

FIG. 4 shows a collision detection sensor 100 according to a first comparison example. The collision detection sensor 100 is configured such that there is substantially no distance between the front end 6b of the absorber 6 and a front end 70b of a chamber member 70 in the vehicle front-rear direction.

Figure 5:
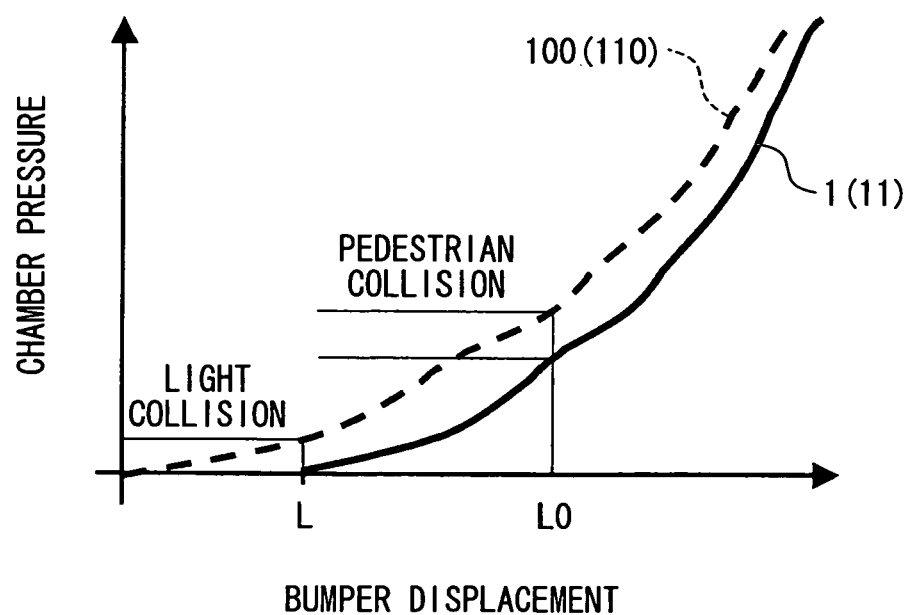
FIG. 5 is a diagram illustrating a relationship between a chamber pressure and a bumper displacement.

FIG. 5 illustrates a relationship between pressure in a chamber room and a displacement (i.e., stroke) of a bumper in the event of a collision. In FIG. 5, a solid line represents the collision detection sensor 1 according to the first embodiment, and a broken line represents the collision detection sensor 100 according to the first comparison example.

In the collision detection sensor 100, pressure in a chamber room 70a of the chamber member 70 changes immediately after a displacement of the bumper cover 3. That is, the pressure in the chamber room 70a changes, even if the displacement of the bumper cover 3 is very small. Therefore, the pressure sensor 8 detects a pressure change in the chamber room 70a even in the event of the light collision.

In contrast, in the collision detection sensor 1, pressure in the chamber room 7a remains unchanged until a displacement of the bumper cover 3 exceeds the separation distance L. Therefore, the pressure sensor 8 does not detect a pressure change in the chamber room 7a in the event of the light collision. As shown in FIG. 5, when the pedestrian collision occurs, the displacement of the bumper cover 3 reaches a distance L0 greater than the separation distance L. Therefore, the pressure sensor 8 detects the pressure change in the chamber room 7a in the event of the pedestrian collision. In such an approach, the ECU 9 can accurately determine based on the pressure change whether the pedestrian collision occurs.

As described above, the collision detection sensor 1 according to the first embodiment is configured in such a manner that the pressure in the chamber room 7a can remain unchanged in the event of the light collision, where there is no need to activate the pedestrian protection apparatus. Specifically, the front end 7b of the chamber member 7 is located further away from the bumper cover 3 than the front end 6b of the absorber 6 in the vehicle front-rear direction. In other words, the front end 6b of the absorber 6 is located further away from the bumper reinforcement 4 than the front end 7b of the chamber member 7 in the vehicle front-rear direction. In the event of the light collision, whereas the absorber 6 is deformed, the chamber member 7 is not deformed so that the pressure in the chamber room 7a can remain unchanged. In contrast, in the event of the pedestrian collision, not only the absorber 6 but also the chamber member 7 are deformed. As a result, the pressure in the chamber room 7a changes, and the pressure sensor 8 detects the pressure change. The ECU 9 determines based on the pressure change that the pedestrian collision occurs. Therefore, it can be accurately determined whether the pedestrian collision occurs.

The chamber member 7 is located outside the absorber 6. That is, the absorber 6 and the chamber member 7 are separate pieces. Therefore, the chamber member 7 can be assembled, after the absorber 6 is assembled to the bumper reinforcement 4. Thus, assembly of the collision detection sensor 1 can be facilitated.

The chamber member 7 is located above the absorber 6 in the vehicle top-bottom direction so that the absorber 6 and the chamber member 7 does not overlap each other in the vehicle front-rear direction. In such an approach, the chamber member 7 can be deformed in the event of a collision without being affected by stiffness of the absorber 6, as compared to when the absorber 6 and the chamber member 7 overlap each other in the vehicle front-rear direction. Therefore, the absorber 6 can be configured to have a relatively high stiffness, and the chamber member 7 can be made of a high elastically deformable material. In such an approach, even when the chamber member 7 is deformed by the collision, the chamber member 7 can return its original shape. When the vehicle is repaired after the collision, there is no need to replace the chamber member 7. That is, the vehicle can be repaired by replacing only the deformed absorber 6. As a result, the vehicle can be repaired at low cost.

Further, according to the collision detection sensor 1, since the absorber 6 is located below the chamber member 7 in the vehicle top-bottom direction, the collision impact force exerted on a lower side of the bumper 2 can be suitably absorbed by the absorber 6. Therefore, legs of a pedestrian hit against the bumper 2 can be effectively protected. Since the chamber member 7 is located above the absorber 6, the collision detection sensor 1 can accurately determine whether the bumper 2 collides with a pedestrian (i.e., human body) or an obstacle (i.e., fixed object) on a road.

Second Embodiment

Figure 6:
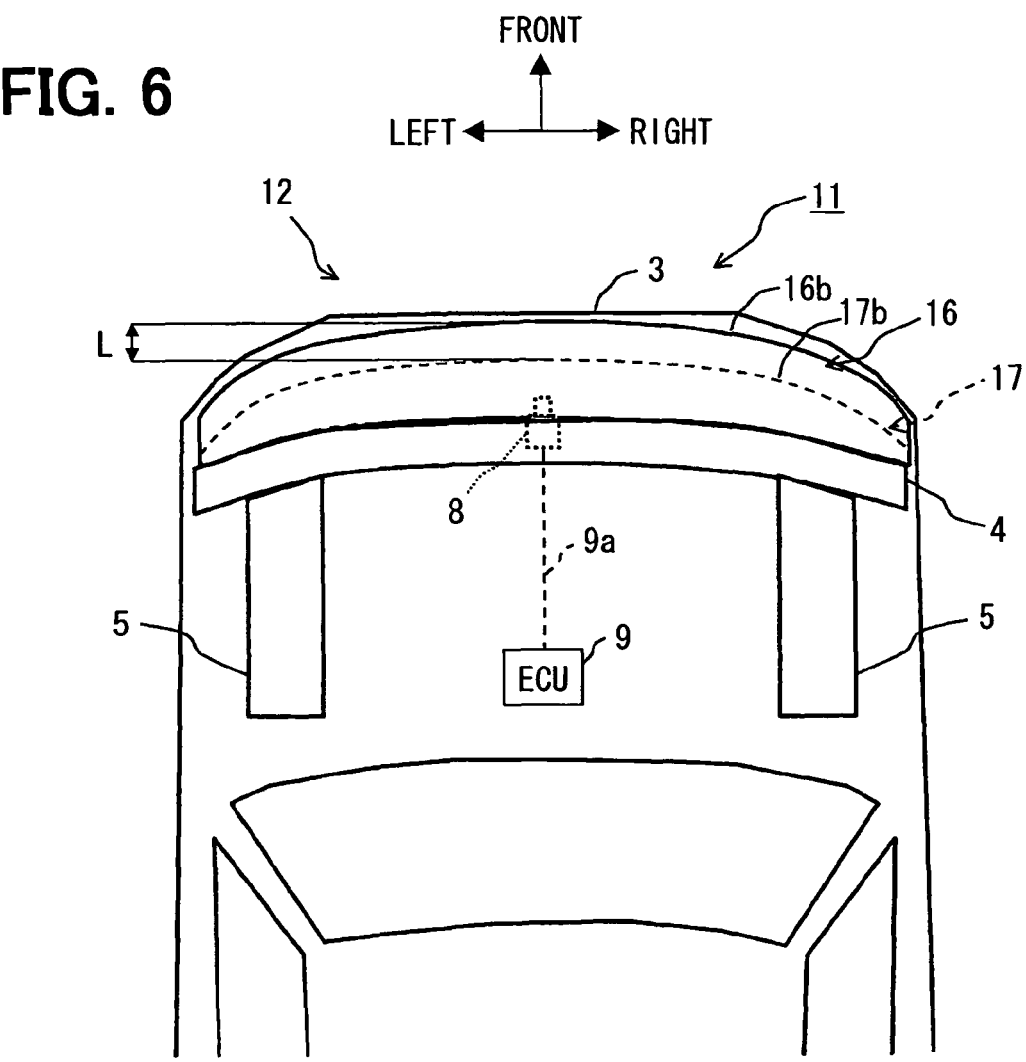
FIG. 6 is a diagram illustrating a perspective top view of a vehicle bumper equipped with a collision detection sensor according to a second embodiment of the present invention.

A collision detection sensor 11 according to a second embodiment of the present invention is described below with reference to FIGS. 6, 7. A difference between the collision detection sensors 1, 11 is as follows.

Figure 7:
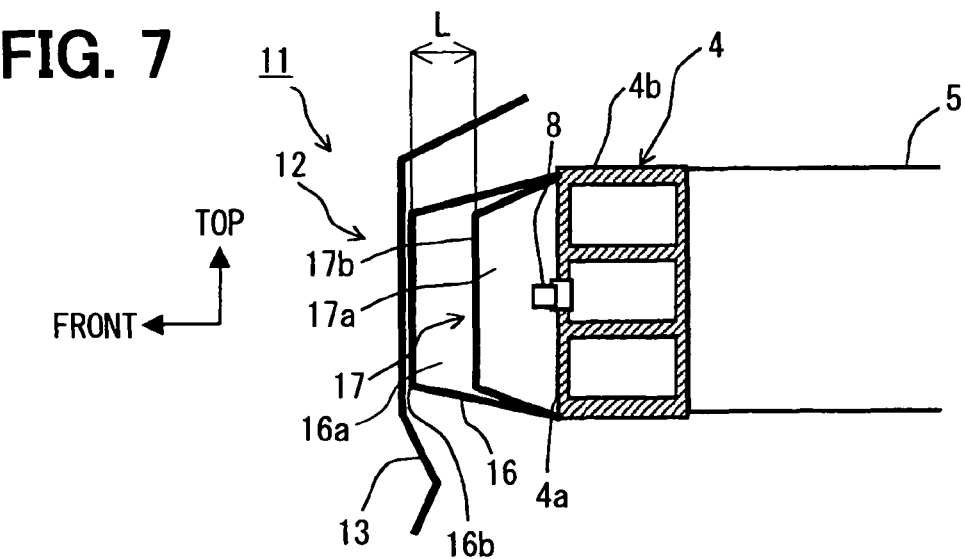
FIG. 7 is a diagram illustrating a perspective side view of the collision detection sensor of FIG. 6.

As shown in FIG. 7, an absorber 16 has an approximately C-shaped vertical cross section taken in the vehicle front-rear direction. Each side of the absorber 16 in the vehicle top-bottom direction is joined to the front surface 4a of the bumper reinforcement 4 so that an impact absorption room 16a can be formed between the absorber 16 and the front surface 4a of the bumper reinforcement 4. Each side of the absorber 16 in the vehicle left-right direction is not joined to the front surface 4a of the bumper reinforcement 4 so that the impact absorption room 16a is opened in the vehicle left-right direction. For example, the absorber 16 can be formed by bending a metal plate.

A chamber member 17 for defining a chamber room 17a is located in the impact absorption room 16a. Like the first embodiment, a separation distance L exists between a front end 16b of the absorber 16 and a front end 17b of the chamber member 17 in the vehicle front-rear direction.

The collision detection sensor 11 operates as follows. FIG. 7 illustrates a vehicle bumper 12 in a normal condition, FIG. 8A illustrates the bumper 12 in the event of the pedestrian collision, and FIG. 8B illustrates the bumper 12 in the event of the light collision.

Figure 8A:
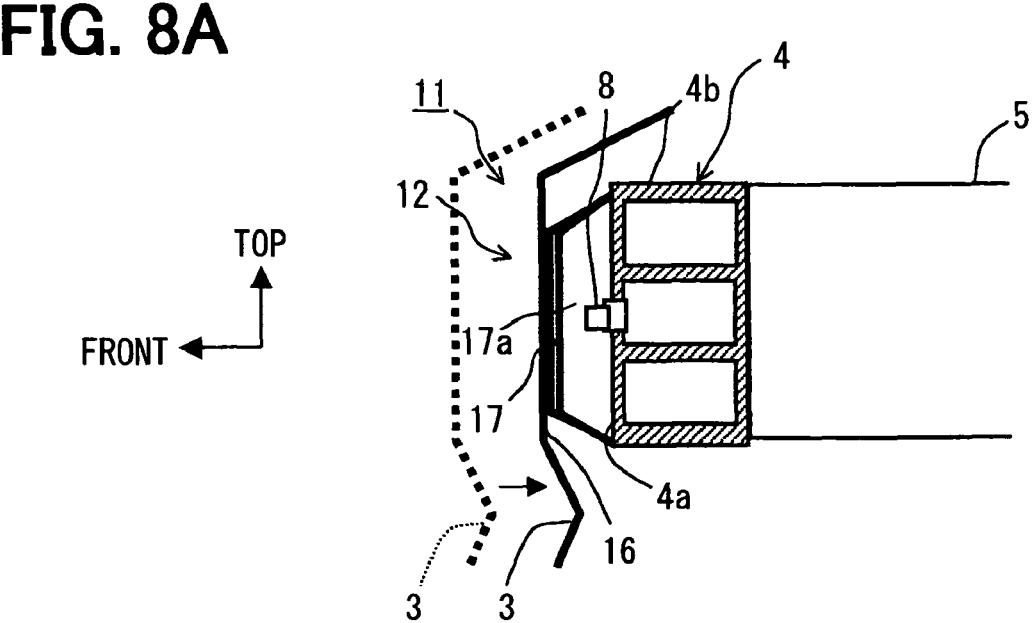
FIG. 8A is a diagram illustrating a perspective side view of the collision detection sensor of FIG. 6 in the event of a pedestrian collision.

As shown in FIG. 8A, when the pedestrian collision with the bumper 12 occurs, the bumper cover 3 is displaced relative to the bumper reinforcement 4 by a distance greater than the separation distance L. Consequently, the absorber 16 is pressed by the bumper cover 3 against the front surface 4a of the bumper reinforcement 4 and deformed. Like the absorber 16, the chamber member 17 is pressed by the bumper cover 3 against the front surface 4a of the bumper reinforcement 4 and deformed. As a result of the deformation of the chamber member 17, pressure in the chamber room 17a changes.

The pressure sensor 8 mounted to the chamber member 17 detects the pressure change in the chamber room 17a and produces a pressure signal having an analog voltage proportional to the detected pressure. The pressure signal is transmitted to the ECU 9 via the signal line 9a. The ECU 9 determines based on the pressure signal whether the bumper 12 collides with the pedestrian. If the ECU 9 determines that the pedestrian collision occurs, the ECU 9 activates the pedestrian protection apparatus.

Figure 8B:
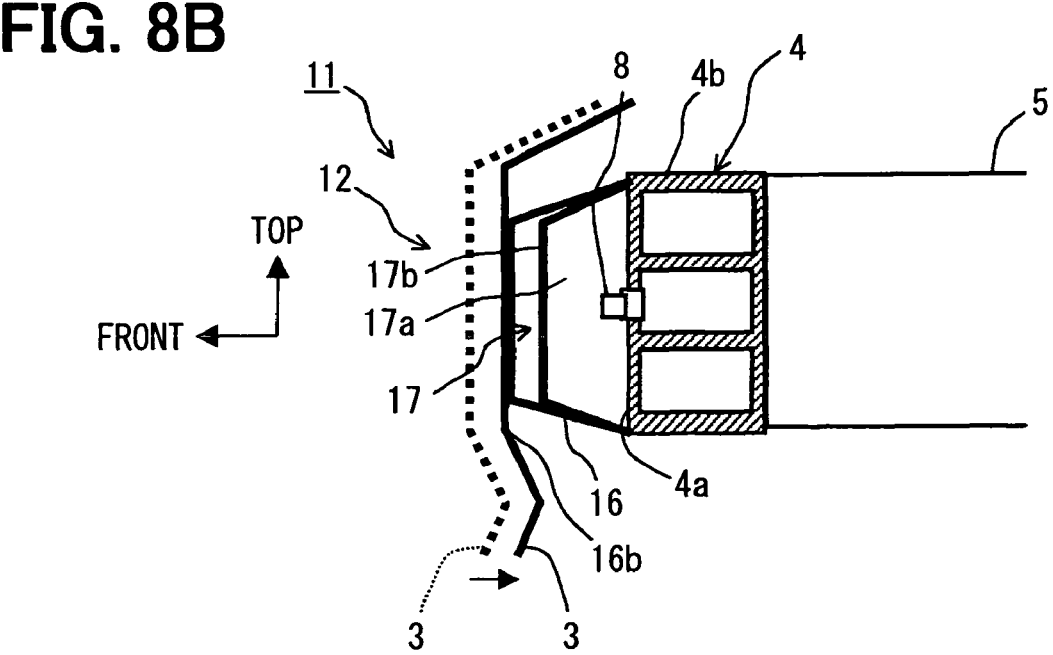
FIG. 8B is a diagram illustrating a perspective side view of the collision detection sensor of FIG. 6 in the event of a light collision.

In contrast, as shown in FIG. 8B, when the light collision with the bumper 12 occurs, the bumper cover 3 is displaced relative to the bumper reinforcement 4 by a distance less than the separation distance L. Consequently, the absorber 16 is pressed by the bumper cover 3 against the front surface 4a of the bumper reinforcement 4 and deformed. Unlike the absorber 16, the chamber member 17 is not pressed by the bumper cover 3, because the separation distance L exists between the front end 17b of the chamber member 17 and the front end 16b of the absorber 16. Therefore, the chamber member 17 is not deformed, and the pressure in the chamber room 17a remains unchanged. As a result, the ECU 9 does not activate the pedestrian protection apparatus in the event of the light collision.

Figure 9:
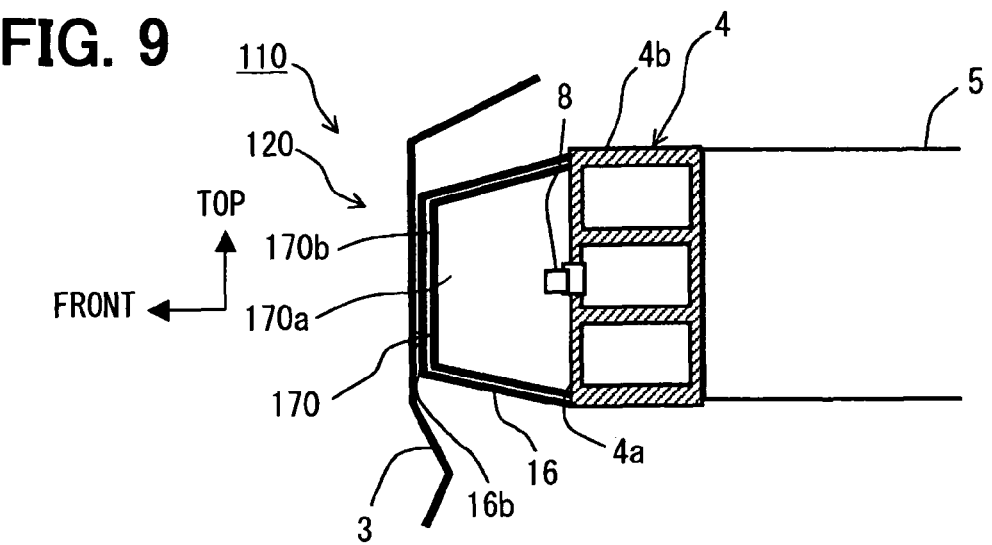
FIG. 9 is a diagram illustrating a perspective side view of a collision detection sensor according to a second comparison example.

FIG. 9 shows a collision detection sensor 110 according to a second comparison example. The collision detection sensor 110 is configured such that there is substantially no distance between the front end 16b of the absorber 16 and a front end 170b of a chamber member 170 in the vehicle front-rear direction.

FIG. 5 illustrates a relationship between pressure in a chamber room and a displacement of a bumper in the event of a collision with a bumper. In FIG. 5, a solid line represents the collision detection sensor 11 according to the second embodiment, and a broken line represents the collision detection sensor 110 according to the second comparison example.

In the collision detection sensor 110, pressure in the chamber room 170a changes immediately after a displacement of the bumper cover 3. That is, the pressure in the chamber room 170a changes, even when the displacement of the bumper cover 3 is very small. Therefore, the pressure sensor 8 detects a pressure change in the chamber room 170a even in the event of the light collision.

In contrast, in the collision detection sensor 11, pressure in the chamber room 17a remains unchanged until the displacement of the bumper cover 3 exceeds the separation distance L. Therefore, the pressure sensor 8 does not detect a pressure change in the chamber room 17a in the event of the light collision. As shown in FIG. 5, when the bumper 12 collides with the pedestrian, the displacement of the bumper cover 3 reaches a distance L0 greater than the separation distance L. Therefore, the pressure sensor 8 detects the pressure change in the chamber room 17a in the event of the pedestrian collision. In such an approach, the ECU 9 can accurately determine based on the pressure change whether the pedestrian collision occurs.

As described above, the collision detection sensor 11 of the second embodiment can have the same effect as the collision detection sensor 1 of the first embodiment. Further, in the event of the pedestrian collision, the amount of the deformation of the absorber 16 of the second embodiment can be accurately detected compared to that of the absorber 6 of the first embodiment.

Modifications

The embodiments described above may be modified in various ways. For example, in the first embodiment, when the energy absorption characteristic of the combination of the bumper cover 3 and the absorber 6 varies in the vehicle left-right direction, it is preferable that the separation distance L vary in the vehicle left-right direction.

Figure 10:
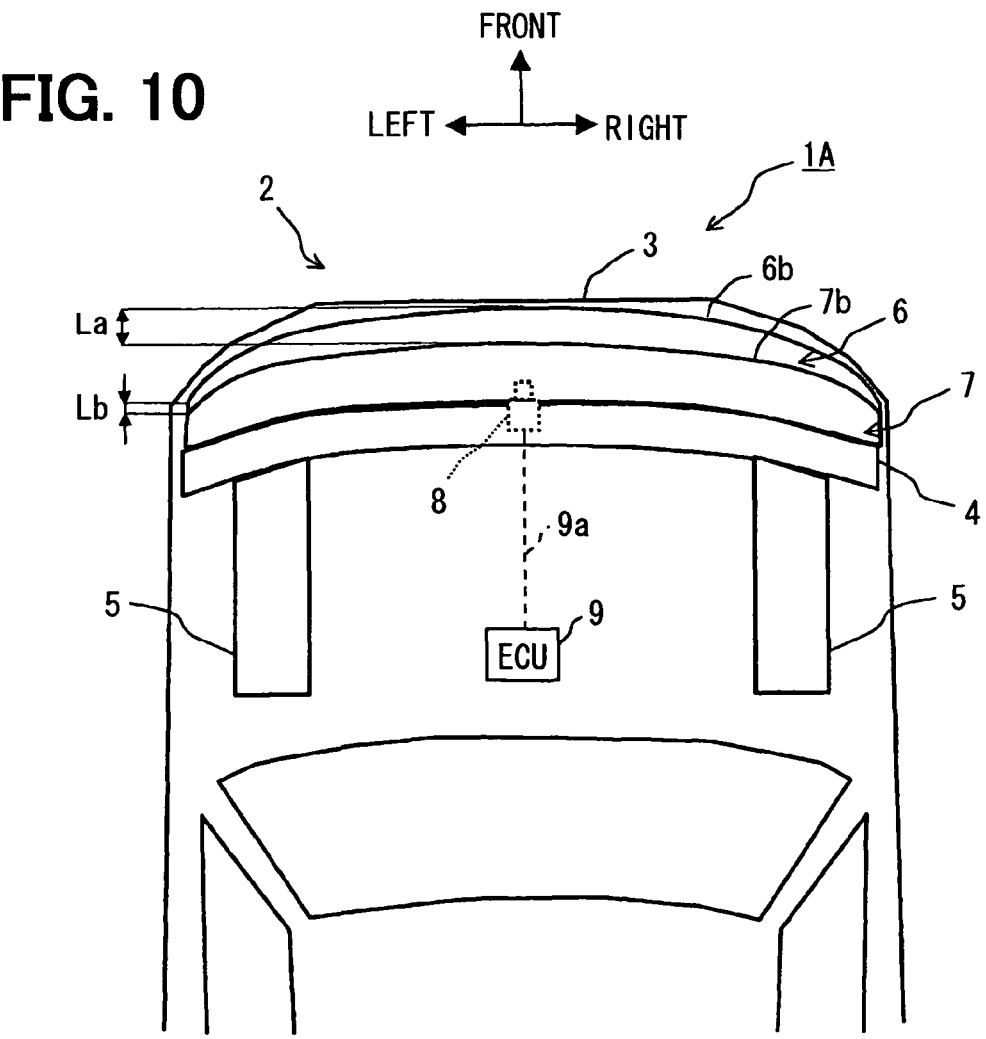
FIG. 10 is a diagram illustrating a perspective top view of a vehicle bumper equipped with a collision detection sensor according to a modification of the collision detection sensor of FIG. 1.

FIG. 10 shows a collision detection sensor 1A according to a modification of the collision detection sensor 1 of the first embodiment. In FIG. 10, the energy absorption characteristic is set less in the middle than ends of the bumper 2 in the vehicle left-right direction. Therefore, the separation distance L is set greater in the middle than the ends of the bumper 2 in the vehicle left-right direction. That is, in FIG. 10, a separation distance La is set greater than a separation distance Lb. In such an approach, it can be ensured that the pressure in the chamber room 7a remains unchanged in the event of the light collision regardless of a position of the bumper 2 the light collision occurs at. Further, it can be ensured that the pressure in the chamber room 7a changes in the event of the pedestrian collision regardless of the position of the bumper 2 the pedestrian collision occurs at. Therefore, it can be accurately determined whether the pedestrian collision occurs. The collision detection sensor 11 of the second embodiment can be modified in the same way as the collision detection sensor 1.

In the above described embodiments, the bumper 2 is a front bumper of a vehicle. The bumper 2 can be a rear bumper of the vehicle.

Such changes and modifications are to be understood as being within the scope of the present invention as defined by the appended claims.

What is claimed is:

1. A collision detection sensor for detecting a collision of a vehicle bumper with an object, the collision detection sensor comprising:
an absorber configured to be deformed with the collision to absorb impact force of the collision, the absorber being located in the bumper and located in front of a bumper reinforcement in a vehicle front-rear direction;
a chamber member defining a chamber room therein, the chamber member being located in the bumper and located in front of the bumper reinforcement in the vehicle front-rear direction;
a pressure sensor configured to detect pressure in the chamber room; and
a collision detection circuit for detecting the collision based on the detected pressure,
wherein a front end of the absorber is located further away from the bumper reinforcement than a front end of the chamber member in the vehicle front-rear direction;
wherein the chamber member is located outside the absorber, the chamber member does not overlap the absorber in the vehicle front-rear direction, and the absorber and the chamber member are separate components; and
wherein a rear end of the absorber, opposite the front end of the absorber in the vehicle front-rear direction, is fixed to a front surface of the bumper reinforcement, and a rear end of the chamber member, opposite the front end of the chamber member in the vehicle front-rear direction, is fixed to the front surface of the bumper reinforcement;
the rear end of the absorber and the rear end of the chamber member are fixed to the same front surface of the same bumper reinforcement.

2. The collision detection sensor according to claim 1, wherein a distance between the front end of the absorber and the front end of the chamber member in the vehicle front-rear direction is set according to stiffness of the entire bumper.

3. The collision detection sensor according to claim 2, wherein the distance increases with a decrease in the stiffness and decreases with an increase in the stiffness.

4. The collision detection sensor according to claim 1, wherein an energy absorption characteristic of a combination of the absorber and a bumper cover located at a front end of the bumper varies in a vehicle left-right direction, and
wherein a distance between the front end of the absorber and the front end of the chamber member varies in the vehicle left-right direction.

5. The collision detection sensor according to claim 4, wherein the distance is greater in a middle than ends of the bumper in the vehicle left-right direction.

6. The collision detection sensor according to claim 1, wherein the chamber member is located above the absorber in a vehicle top-bottom direction.

7. The collision detection sensor according to claim 1, wherein the absorber has a curved plate-like shape,
wherein an impact absorption room is defined between the absorber and a front surface of the bumper reinforcement, and
wherein the chamber member is located in the impact absorption room.

8. The collision detection sensor according to claim 1, wherein a rear end of the absorber is in contact with the bumper reinforcement, and
wherein a rear end of the chamber member is in contact with the bumper reinforcement.

9. The collision detection sensor according to claim 1, wherein the object is a pedestrian.

10. The collision detection sensor according to claim 1, wherein the absorber and the chamber room do not communicate with each other.

11. The collision detection sensor according to claim 1, wherein the pressure sensor is configured not to detect pressure in the absorber.

12. The collision detection sensor according to claim 10, wherein the pressure sensor is configured not to detect pressure in the absorber.

13. The collision detection sensor according to claim 1, wherein a space is located between the chamber member and the bumper in the vehicle front-rear direction.

14. The collision detection sensor according to claim 13, wherein the space is located above the absorber.

15. The collision detection sensor according to claim 1, wherein the rear end of the absorber is fixed to a lower side of the front surface of the bumper reinforcement, and the rear end of the chamber member is fixed to an upper side of the front surface of the bumper reinforcement so that the chamber member is located above the absorber in a vehicle top-bottom direction.

16. The collision detection sensor according to claim 15, wherein the rear end of the absorber and the rear end of the chamber member are located at the same position in the vehicle front-rear direction.

17. The collision detection sensor according to claim 16, wherein the front surface of the bumper reinforcement is a continuous flat surface.

\* \* \* \* \*